July 22, 1947.                   G. E. KING                   2,424,321
                    TORQUE CONTROL FOR PAIRED ELECTRIC MOTORS
                            Filed June 16, 1945
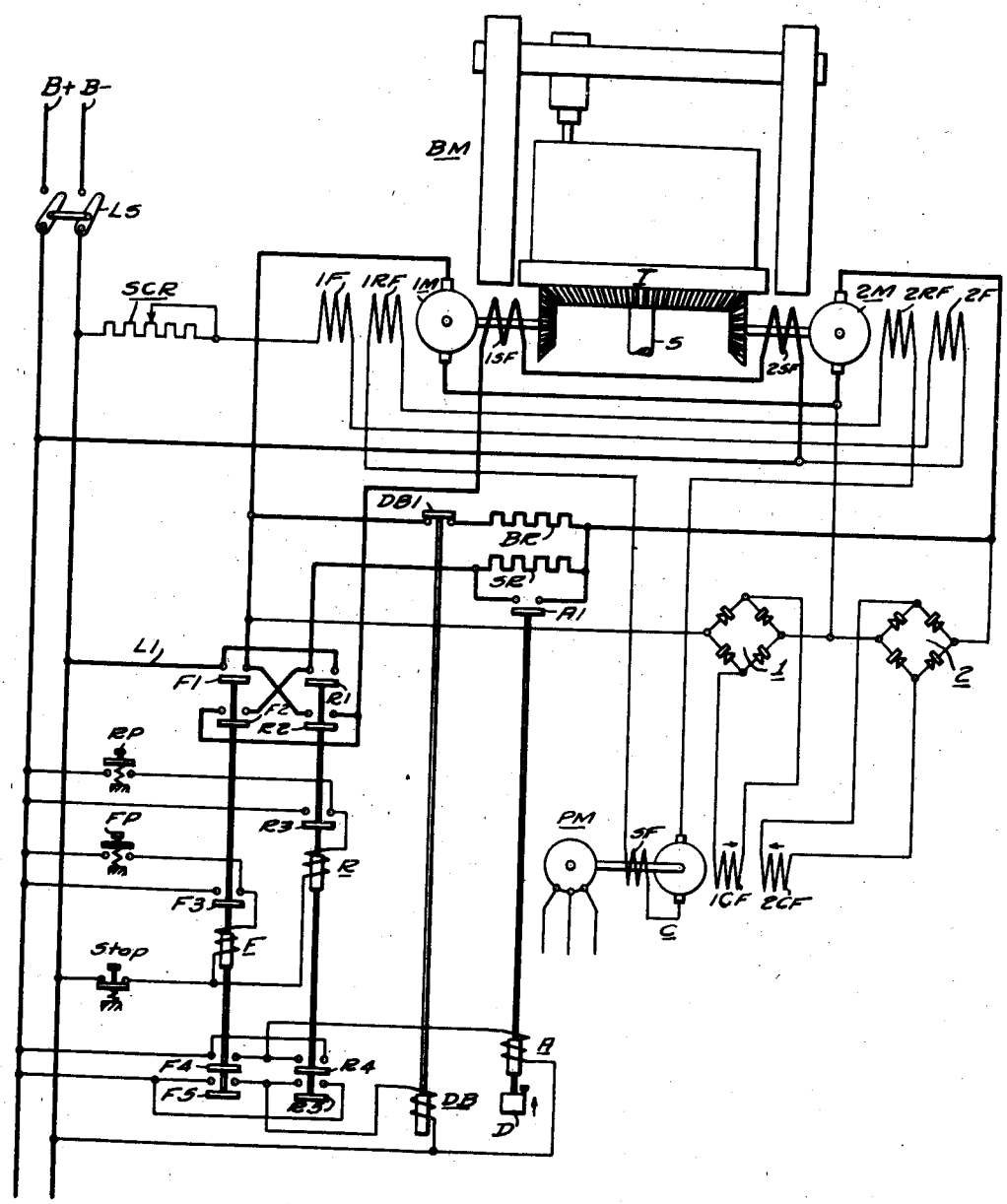
WITNESSES:                                                INVENTOR
                                                       George E. King.
                                                            BY
                                                       Paul E. Friedemann
                                                          ATTORNEY Patented July 22, 1947

2,424,321

UNITED STATES PATENT OFFICE 2,424,321

TORQUE CONTROL FOR PAIRED ELECTRIC MOTORS

George E. King, Swissvale, Pa., assignor to Westinghouse Electric Corporation, East Pittsburgh, Pa., a corporation of Pennsylvania Application June 16, 1945, Serial No. 599,833

5 Claims. (Cl. 172—239)

1

This invention relates generally to electrical control systems of the type in which predetermined properties of a pair of elements are to be matched. More particularly, the invention is directed to a system of control for a pair of motors in which the torque characteristic of the motors are to be matched.

While the principles of this invention are specifically illustrated in connection with a variable voltage drive including a pair of motors whose torques are to be held at equal values, it is apparent that the invention is not necessarily limited to this particular application, but may be applied in general to any system involving a pair of elements, the electrical characteristics of which may be utilized to effect a matching of certain operating properties of the pair of elements.

An object of this invention is to provide an electrical system in which selected characteristics of a pair of elements may be matched.

Another object of this invention is to provide a system for controlling the torques of a pair of motors in which the total field strength of each of the motors is simultaneously oppositely varied.

A further object of this invention is to provide a variable voltage drive including a pair of driving motors in which the motor speeds are simultaneously controlled and which provides automatic regulation of the motor torques independently of the mentioned speed regulation.

A still further object of this invention is to provide a variable voltage drive including a pair of motors in which provision is made for simultaneously regulating the speeds of both motors, reversing of the motors and automatically regulating the torques of both motors.

Other objects and advantages will become more apparent upon a study of the following specification when considered in conjunction with the accompanying drawing, in which the single figure illustrates a variable voltage drive embodying the principles of this invention.

Some machine tool drives require a pair of driving motors. An example of this is found in the table drives of large boring mills. On a large boring mill, the diameter of the driving ring gear for the table may be in the neighborhood of thirty feet. With such a large assembly in order to avoid the use of a very large motor and more importantly to distribute the driving forces for the table about the table rotation axis, a pair of diametrically disposed motors are used to drive the table. These motors must have their torques matched otherwise there will result an

2 unbalance of driving forces on the table which may cause considerable pressure on the bearings and table guides. This situation is not conducive to the maintaining of accuracy in machining operations.

Motors in such boring mill drives usually operate over a wide speed range, say, of the order of about 200 to 1200 R. P. M. While it is possible to match the motor fields at the full field and weak field speeds and thus obtain equal motor torques, assuming, of course, equal armature currents, it has been found that the fields of the separate motors will vary in excitation at points intermediate the full and weak settings by as much as 10%. Conditions such as this are not at all satisfactory since an unbalanced driving force loading of the table results.

This invention obviates unbalanced motor torques by providing means for regulating the motor torques automatically. In general, this regulation is accomplished by connecting the motor armatures in a series circuit—that like currents circulate in both armatures, differentially comparing the motor armature terminal voltages and thereafter utilizing the resulting voltage to simultaneously oppositely vary the total field strength of the motors. Since the torque of each motor is proportional to the armature current and field flux, and the armature currents are equal by reason of the series connection, it is apparent that the motor armature terminal voltage will vary as the torque loading varies. Thus the motor armature terminal voltages represent a convenient and accurate electrical quantity upon which corrections in field excitation may be based to produce the desired torque balance. Further, such a method is inherently fast in providing correcting quantities, since the voltage change is practically instantaneous. When the armature voltages are balanced, the field fluxes are balanced and in view of the common current in both armatures, the motor torques must be balanced.

As before noted, this invention provides for simultaneous opposite variation of the total field strength of the motors; that is, the field system of one motor is weakened while the field system of the other motor is strengthened. This is important for the reason that on a motor adjustable over a wide speed range the motor fields are substantially saturated at full field and may be close to the residual flux value of the machine at weak field. Obviously, when operating at or near full field speed, it is difficult to change the speed of a motor by strengthening its field. Conversely, when operating at or near weak field speed it is difficult to change the speed by further weakening the motor field. Thus by regulating the fields of both motors, the extent of regulation on any one motor is minimized.

Referring now to the drawing, the invention by which the foregoing desirable functions are accomplished is represented in the boring mill drive which includes, generally, a pair of driving motors 1M and 2M each provided with a plurality of field windings, which motors drive the table T about the axis of the shaft S of the boring mill BM, from opposite sides thereof; a control generator C which is excited according to the differential of the motor armature terminal voltages and the output of which controls the excitation of certain of the field windings of the motor; and forward and reversing contactors F and R which function primarily to reverse the connections of the motor armatures to the supply conductors B+ and B− to effect reversing of the motors. The remaining circuit controlling elements, namely, the dynamic braking relay DB which inserts the braking resistor BR during the decelerating portion of the cycle of motor operation and the dashpot D equipped accelerating relay A which removes the starting resistor SR from the motor armature circuit a short time interval after the motor is started, are merely conventional motor control elements which are utilized to provide a satisfactory operating system.

The armature windings of the motors 1M and 2M are connected in series circuit relation between the contacts F1, F2 and R1, R2, respectively, of the forward and reverse contactors, F and R. The series field windings 1SF and 2SF, respectively, of the motors 1M and 2M together with either of the contacts F2 or R2 complete one side of this series circuit to the supply bus B+ while the other side is completed through the lead L1 from either of the contacts F1 and R1 to the supply bus B−. The main field windings 1F and 2F of the motors are connected in a series circuit with the speed controlling rheostat SCR across the supply conductors B+ and B−. The excitation of these windings is varied simultaneously by adjustment of the rheostat SCR. With identical windings and favorable operating conditions, equal fluxes may be produced by the simple adjustments of the rheostat SCR. Thus both of the motors are simultaneously speed regulated. The regulating field windings 1RF and 2RF are also connected in series circuit relation and the series circuit terminals are connected across the output terminals of the control generator C. The windings 1RF and 2RF are so arranged in the series circuit that for one direction of current flow from the control generator C, for example, the winding 1RF will be cumulative with respect to the windings 1F and 1SF in the motor 1M, while the winding 2RF will function differentially with respect to its associated windings 2SF and 2F in the motor 2M. When the current output of the control generator C is reversed, the function of the motor regulating field windings in the respective motors is reversed, the winding 1RF then being differentially related to its associated winding while the winding 2RF becomes cumulative with respect to its associated windings. Thus, further by way of example, if the motor 1M is developing the greater torque its armature voltage will be the greater of the two. It is then merely necessary to determine the proper polarity of the armature terminals of the control generator to produce a current in the series motor field circuit to cause the field 2RF to act cumulative to increase the field flux of the motor 2M and to cause the field 1RF to act differentially to reduce the total field flux of the motor 1M to tend to restore a balance of torque and, hence, a balance of armature voltages.

The control generator C has special operating characteristics which are obtained by adjusting the slope of the resistance line of the series field circuit such that tangency thereof with the initial straight line portion of the no-load saturation curve of the machine exists. Normally, a generator is adjusted so that the slope of the resistance line is less than that of the saturation curve; thus the generator output is determined by the points of intersection of the saturation curve with the resistance line. If the slope of the resistance line is greater, the generator cannot generate a voltage. While the adjustment here provided results in operating characteristics normally unsuited for standard generator applications, these characteristics are ideal for a control or regulating generator as herein employed. The generator may have an output anywhere along the points of tangency of the resistance line and saturation curve. It then becomes the function of the field windings 1CF and 2CF of this machine to locate the proper operating point along the tangent curves. The output of the generator at such point results from the self energizing properties thereof. The control fields 1CF and 2CF maintain that operating point constant for the given control condition.

The control fields 1CF and 2CF in the control generator to this end are connected differentially, the control field 1CF being connected through a full wave bridge rectifier 1 across the armature of the motor 1M and the field 2CF being connected through a full wave bridge rectifier 2 across the armature of the motor 2M. Each field is energized according to the armature voltage of the corresponding motor. When the armature voltages are equal and thus the motor torques equal the total differential field flux in the control generator is zero. However, when the armature voltages are unbalanced, the unbalanced differential flux acting cummulatively or differentially with the series field flux depending upon the direction of unbalance of the armature voltages excites the control generator and an electrical output thereof occurs in such a direction that the excitation of the regulating fields 1RF and 2RF of the motors simultaneously oppositely vary the total excitation of the two motors, in a manner to match or rebalance the motor torques. In providing the correcting current, the operating point of the control generator under the influence of the unbalanced differential fields thereof has shifted to a new position along the mentioned tangent curves. This position is maintained once torque balance is achieved by the action of the series connected field winding and departure from that point is prevented by the action of the differentially connected control generator fields until torque equilibrium may be again disturbed and a further correction required.

The operation of the system may be described as follows. When it is desired to start the boring mill table the attendant first closes the line switch LS thus completing the energizing circuits along the buses B+ and B−. If it is desired to operate the table T in the forward rotational direction, that is, the direction in which the work piece is moved into the cutting tool, the forward push button FP is depressed. This completes an energizing circuit therethrough for the coil of the forward contactor F including the Stop push button thereby connecting the coil of the F contactor across the buses B+ and B—. The forward contactor closes its contacts F1 and F2 connecting the motor armatures and series fields 1SF and 2SF across the energizing buses B+ and B—. The motors begin to rotate up to the speed determined by the excitation of the main fields 1F and 2F which excitation in turn is determined by the setting of the speed controlling rheostat SCR. The contact members F3 complete an energizing circuit for the coil of this relay through the Stop push button, which is independent of the position of the forward push button FP. The contact members F4 energize the coil of the accelerating relay A which after a short time lag, depending upon the setting of the dashpot D connected thereto shorts the current limiting starting resistor SR from the series circuit at the contacts A1 thereof. The contact members F5 complete the energizing circuit for the coil of the dynamic braking relay DB which relay immediately opens the dynamic braking circuit including the braking resistor BR, at its contacts DB1. Throughout the operation of the motors, the differential action of the control fields 1CF and 2CF of the control generator C maintains the proper corrective excitation current in the motor regulating fields 1RF and 2RF. Thus the motor torques are constantly regulated for a condition of torque equilibrium.

When the attendant desires to stop the equipment, the Stop push button is depressed. The relay F is deenergized and drops out thereby disconnecting the motor armature windings and series motor fields 1SF and 2SF from the energizing buses. At the same time the contacts F4 and F5 deenergizes the relays A and DB. When the contacts DB1 close, the braking resistor BR is connected in a loop circuit with the armatures of the two motors and dynamic braking takes place.

For reverse operation, the reverse push button RP is depressed and an energizing circuit therethrough including the Stop push button is completed across the buses B+ and B—. The contacts R1 and R2 reversely connect the motor armatures and series fields across the buses B+ and B—, and hence effect a reversal in rotation of the motors. The contact member R3 establishes a holding circuit for the coil of the reverse contactor, while the contact members R4 and R5, respectively, energize the relays A and DB. Otherwise, the function of the system is the same as for forward operation.

It is necessary to use the rectoxes or rectifiers 1 and 2 to maintain an unchanged polarity at the armature terminals of the control generator C when the motors are used for a reversing application. One rectifier could be used in the series armature circuit of the control generator C instead of two in the field circuits thereof, as shown. However, the current and voltage in the armature circuit vary from zero to the maximum needed for regulating purposes. The resistance of rectifiers of the copper-oxide type which is the type illustrated, varies considerably at low currents and this characteristic is undesirable because it would affect the adjustment of the circuit providing the preferred operating characteristics of the control generator and so affect the regulation. When the rectifiers 1 and 2 are connected in the field circuits, as shown, they do not measurably affect the corrective current, since, the control fields 1CF and 2CF across the motor armatures always operate at substantially the same voltage and current for the reason it is the function of the control generator C to force the armature voltages to divide equally. In addition, a fairly uniform higher base current exists.

The foregoing disclosure and the showing made in the drawing are merely illustrative of the principles of this invention and are not to be interpreted in a limiting sense. The only limitations are to be determined from the scope of the appended claims.

I claim as my invention:

1. In a variable voltage drive for a pair of motors having their rotors mechanically interconnected, each motor having armature windings and field windings, the combination of, circuit means connecting the armature windings in series circuit relation, means for reversibly energizing the armature windings, circuit means connecting a portion of the field windings of each of said motors in series circuit relation, means for energizing said field winding portions, circuit means connecting a second portion of the field windings of each of said motors in series circuit relation, a pair of bridge rectifiers, one for each motor, circuit means connecting one of said bridge rectifiers with one of said motors to be energized in dependence of the armature terminal voltage of said one motor, circuit means connecting the other of said bridge rectifiers with the other of said motors to be energized in dependence of the armature terminal voltage of said other motor, means for differentially comparing the electrical outputs of said bridge rectifiers and producing a resulting electrical quantity representative of the difference of said electrical outputs, and means for energizing said second series connected portion of said motor field windings according to the resulting electrical quantity.

2. In a variable voltage drive for a pair of motors having their rotors mechanically connected, each motor having armature windings and field windings, the combination of, means for energizing the armature windings, means for energizing a portion of the field windings of each of said motors, a pair of bridge rectifiers, one for each motor, circuit means connecting one of said bridge rectifiers with one of said motors to be energized in dependence of the armature terminal voltage of said one motor, circuit means connecting the other of said bridge rectifiers with the other of said motors to be energized in dependence of the armature terminal voltage of said other motor, means for producing a control electrical quantity which is the differential of the electrical outputs of each of said bridge rectifiers, and means for energizing another portion of the field windings of each of said motors according to said control electrical quantity.

3. In a variable voltage drive for a pair of motors, each motor having armature windings and each having field windings, the combination of, means for reversibly energizing the armature windings, means for energizing a portion of the field windings of each motor, a bridge rectifier connected across the armature terminals of one motor, a bridge rectifier connected across the armature terminals of the other motor, a generator having a pair of differentially related field windings, circuit means connecting one of said differential field windings to be energized in dependence of the electrical output of one bridge rectifier, circuit means connecting the other differential field winding to be energized in dependence of the electrical output of the other of said bridge rectifiers, and circuit means connecting said generator with the remaining portion of said field windings for energizing said remaining portion of said field windings of each of said motors.

4. In a variable voltage drive a pair of motors, each motor having armature windings and each having field windings, the combination of, means for supplying energization to the armature windings, circuit means connecting a portion of the field windings of each motor in series circuit relation, means for supplying energization to said series connected field winding portions, circuit means connecting a second portion of the field windings of each motor in series circuit relation, a generator having a pair of differentially connected field windings, a unidirectional current device connecting one generator field winding across one of said motor armature windings, a second unidirectional current device connecting the other generator field winding across the other motor armature winding, and circuit means electrically connecting said second series connected field winding portions of each of said motors to be energized according to the electrical output of said generator.

5. In a variable voltage drive for a pair of motors, each having armature windings and each having field windings, the combination of, circuit means connecting said armature windings in series-circuit relation, means for reversibly energizing the armature windings, circuit means connecting a portion of the field windings of each motor in series circuit relation, means for supplying energization to said series connected field winding portions, circuit means connecting a second portion of the field windings of each motor in series circuit relation, a generator having a pair of differential field windings, circuit means including a rectifier connecting one generator field winding across one of said motor armature windings, circuit means including a rectifier connecting the other generator field winding across the other motor armature winding, and circuit means electrically connecting said second series connected field winding portions of each of said motors to be energized according to the electrical output of said generator.

GEORGE E. KING.

REFERENCES CITED

The following references are of record in the file of this patent:

UNITED STATES PATENTS

| Number | Name | Date |
|---|---|---|
| 1,877,681 | Mickey | Sept. 12, 1932 |
| 2,315,386 | Baldwin | Mar. 30, 1943 |